United States Patent
Kim et al.

(10) Patent No.: US 10,116,351 B2
(45) Date of Patent: Oct. 30, 2018

(54) POLLUTION DETECTION CIRCUIT FOR DATA LINES AND METHOD THEREOF

(71) Applicant: SEMICONDUCTOR COMPONENTS INDUSTRIES, LLC, Phoenix, AZ (US)

(72) Inventors: Eui-Soo Kim, New Taipei (TW); Ju-Hyun Kim, Kyounggi-Do (KR); Yung-I Chang, Taipei (TW); Jian-Ming Fu, Taichung (TW); Zhi-Bo Tao, Palo Alto, CA (US); Jung-Sheng Chen, Kaohsiung (TW); Young-Bae Park, Taipei (TW); David Jay Kunst, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 313 days.

(21) Appl. No.: 15/000,487

(22) Filed: Jan. 19, 2016

(65) Prior Publication Data

US 2016/0209347 A1  Jul. 21, 2016

Related U.S. Application Data

(60) Provisional application No. 62/105,309, filed on Jan. 20, 2015.

(51) Int. Cl.
*G01R 27/08* (2006.01)
*H04B 3/46* (2015.01)

(52) U.S. Cl.
CPC ..................... *H04B 3/46* (2013.01)

(58) Field of Classification Search
CPC ........ G01N 17/00; G01N 17/02; G01N 17/04; G01N 27/9046; G01B 7/23
USPC .................................................. 324/699, 700
See application file for complete search history.

(56) References Cited

U.S. PATENT DOCUMENTS

| | | | |
|---|---|---|---|
| 6,512,444 B1 * | 1/2003 | Morris, Jr. | H02H 5/042 219/510 |
| 6,805,788 B1 * | 10/2004 | Gonzalez-Martin | G01N 17/02 204/400 |
| 6,914,435 B2 * | 7/2005 | Graham | G01R 23/20 324/500 |
| 7,069,116 B2 * | 6/2006 | Kunsman | H02H 1/0015 324/525 |
| 7,577,003 B2 * | 8/2009 | Nakamura | H02M 3/33523 363/21.12 |
| 2006/0061368 A1 * | 3/2006 | Furse | G01R 31/11 324/519 |

(Continued)

FOREIGN PATENT DOCUMENTS

| | | | | |
|---|---|---|---|---|
| EP | 3156986 A1 * | 4/2017 | | G08B 25/04 |
| TW | 201108554 A | 3/2011 | | |
| TW | 201424190 A | 6/2014 | | |

*Primary Examiner* — Tung X Nguyen
*Assistant Examiner* — Dominic Hawkins
(74) *Attorney, Agent, or Firm* — Robert F. Hightower

(57) ABSTRACT

A pollution detection circuit and a pollution detection method for data lines are provided. The pollution detection circuit and the method detect an impedance of at least one data terminal for detecting the pollution occurring at the data terminal or the data lines. The pollution occurring at the data terminal or the data lines is confirmed when the impedance is low.

20 Claims, 10 Drawing Sheets

(56) References Cited

U.S. PATENT DOCUMENTS

| | | | |
|---|---|---|---|
| 2008/0122617 A1* | 5/2008 | Browning | G02B 6/4416 340/541 |
| 2009/0284264 A1* | 11/2009 | Ng | G01R 31/083 324/525 |
| 2011/0270545 A1* | 11/2011 | Doktar | G01R 31/025 702/58 |
| 2012/0217935 A1 | 8/2012 | Hawawini et al. | |
| 2013/0050882 A1* | 2/2013 | Rostron | H02H 3/083 361/44 |
| 2013/0185462 A1 | 7/2013 | Manabe | |
| 2017/0052222 A1* | 2/2017 | Pasdar | G01R 31/085 |

* cited by examiner

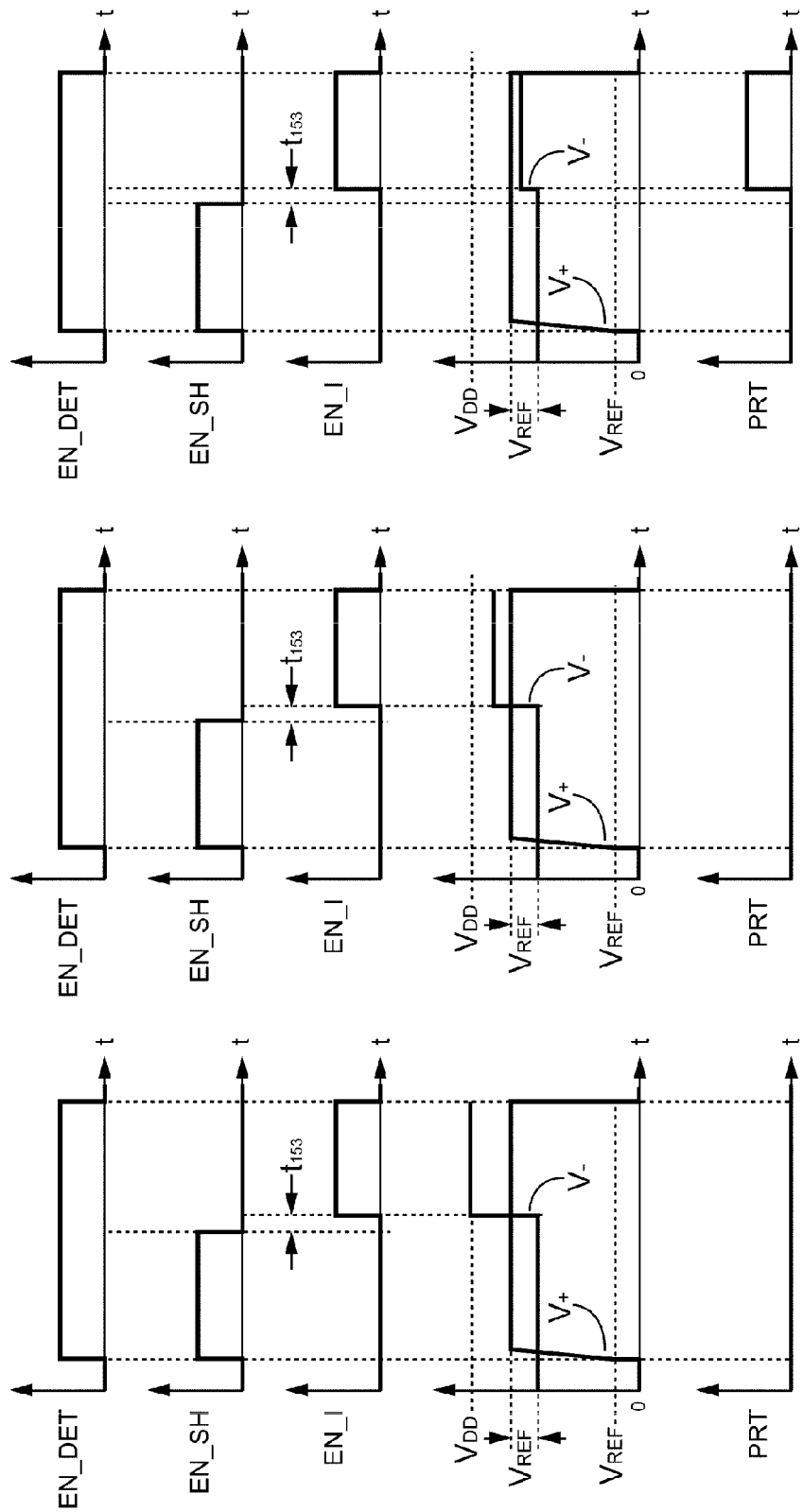

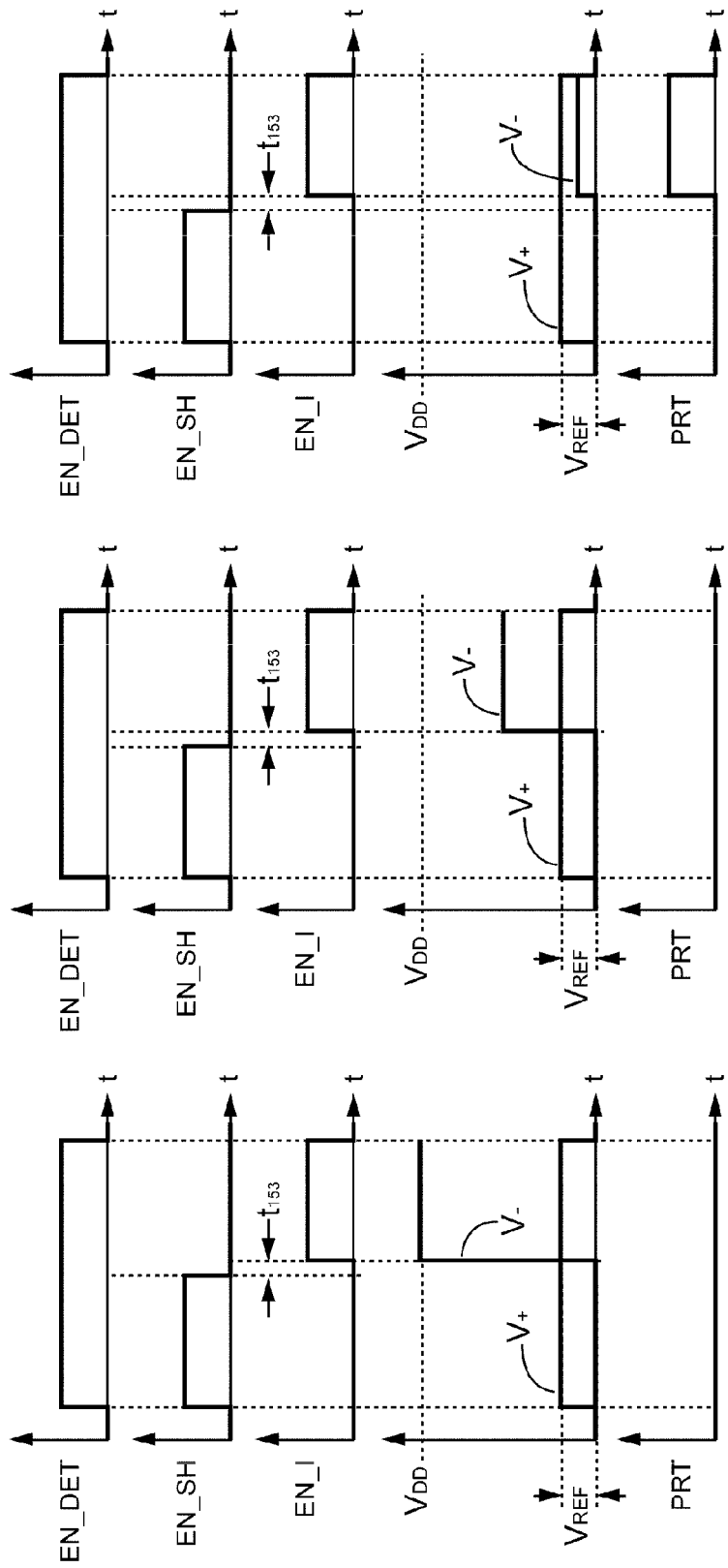

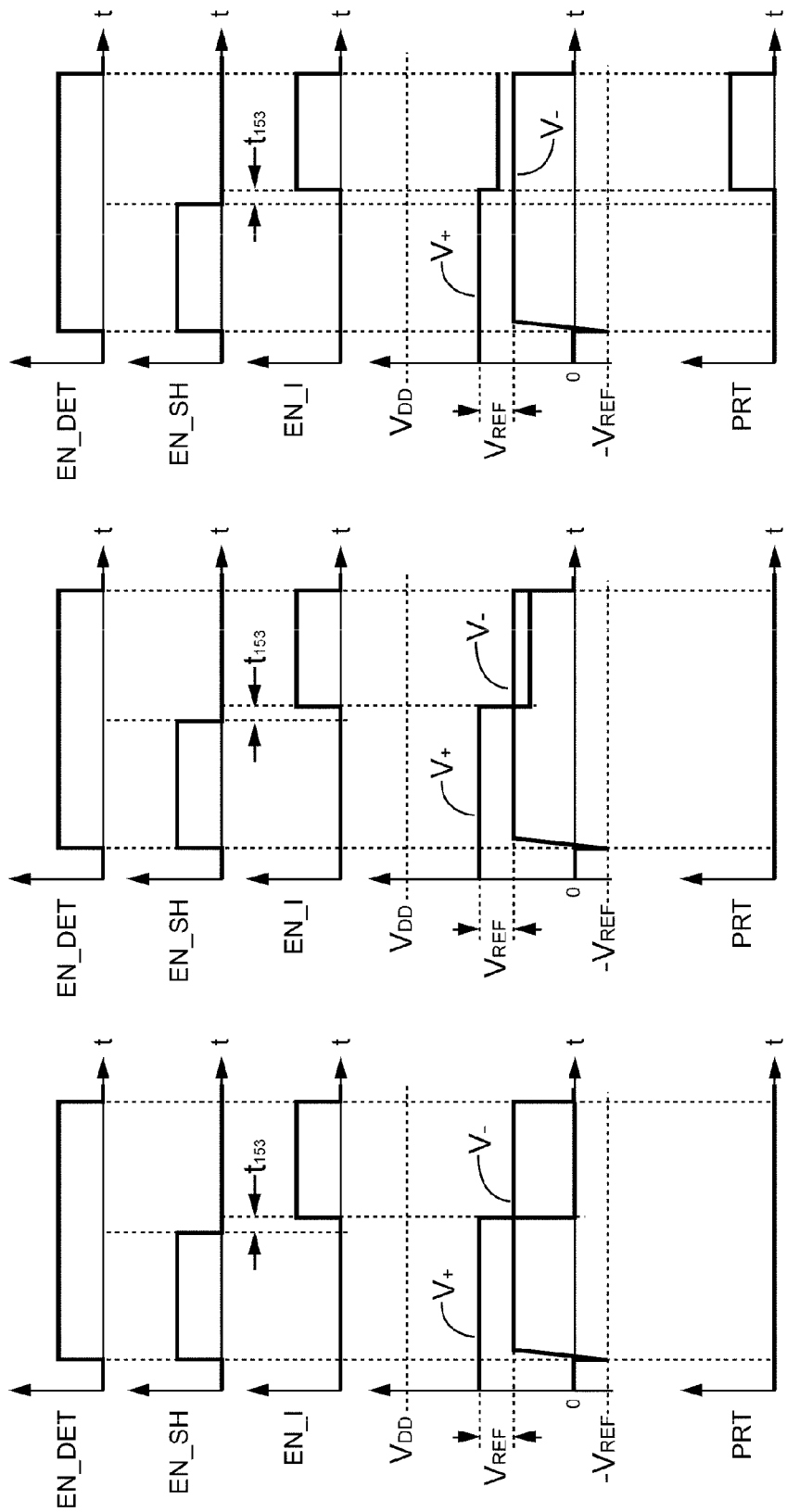

POLLUTION DETECTION CIRCUIT FOR DATA LINES AND METHOD THEREOF

REFERENCE TO RELATED APPLICATIONS

This Application is based on Provisional Patent Application Ser. No. 62/105,309, filed 20 Jan. 2015, currently pending.

BACKGROUND OF THE INVENTION

Field of Invention

The present invention relates to an adaptive power converter, and more specifically relates to a detection circuit and a detection method for detecting the pollution at data lines of the adaptive power converter.

Description of Related Art

In the past few years, mobile devices are becoming a necessity to people's lives. Power converters (chargers) designed for those devices usually come with them in the same sales package provided by the manufacturer. This guarantees those mobile devices to be always powered in normal condition.

In recent developments, chargers using USB (Universal Series Bus) cables to connect their target mobile devices are replacing traditional twisted-pair-cable chargers. In addition to those two wires functioning the same as the traditional chargers to serve as power supply and ground, there are two extra data lines in USB cables to define a type of charging device such as SDP (Standard Downstream Port), CDP (Charging Downstream Port) and DCP (Dedicated Charging Port). These two data lines, recently, have been used for communication between the mobile devices and the chargers, such as adaptively changing the power supply level of the chargers.

However, the USB connectors regardless the male-types or the female-types in charger side or the mobile device side are usually in tiny scale and very possibly polluted by small particles like dust or other conductive media like water. When the data terminals are with low impedance due to the pollution as above mentioned, the data transmitted over the data terminals (lines) might be biased and lead to wrong communication between the chargers and the mobile devices. Taking adaptive charging control for example, that wrong communication can cause abnormal power supply level to the mobile devices and lead to danger. Therefore, a detection circuit and a detection method for detecting the pollution occurring at data terminals of the connectors in the chargers and the mobile devices or the pollution occurring at the data lines of the cable connected between the chargers and the mobile devices are desired by the industries.

BRIEF SUMMARY OF THE INVENTION

The objective of the present invention is to provide a detection circuit and a detection method for detecting the pollution occurring at data terminals of the connectors in chargers and the mobile devices or the pollution occurring at data lines of the cable connected between the chargers and the mobile devices.

The pollution detection circuit for data lines according to the present invention comprises an impedance detector coupled to at least one data terminal and detecting an impedance of the data terminal for detecting the pollution at the data terminal or the data lines. The pollution is confirmed when the impedance is low.

The pollution detection method for data lines according to the present invention detects an impedance of at least one data terminal for detecting the pollution at the data terminal or the data lines. Once the impedance is low, the pollution is confirmed.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

FIG. 5A shows the waveforms of the signals $V_+$ and $V_-$ in FIG. 4 when the signal $V_-$ at the data terminal (or data line) $D_+$ includes a voltage level shift and the data terminal $D_+$ has no pollution at itself in accordance with the present invention.

FIG. 5B shows the waveforms of the signals $V_+$ and $V_-$ in FIG. 4 when the signal $V_-$ at the data terminal $D_+$ includes the voltage level shift and the data terminal $D_+$ has slight pollution at itself in accordance with the present invention.

FIG. 5C shows the waveforms of the signals $V_+$ and $V_-$ in FIG. 4 when the signal $V_-$ at the data terminal $D_+$ includes the voltage level shift and the data terminal $D_+$ has heavy pollution at itself in accordance with the present invention.

FIG. 5D shows the waveforms of the signals $V_+$ and $V_-$ in FIG. 4 when the signal $V_-$ at the data terminal $D_+$ excludes any voltage level shift and the data terminal $D_+$ has no pollution at itself in accordance with the present invention.

FIG. 5E shows the waveforms of the signals $V_+$ and $V_-$ in FIG. 4 when the signal $V_-$ at the data terminal $D_+$ excludes any voltage level shift and the data terminal $D_+$ has slight pollution at itself in accordance with the present invention.

FIG. 5F shows the waveforms of the signals $V_+$ and $V_-$ in FIG. 4 when the signal $V_-$ at the data terminal $D_+$ excludes any voltage level shift and the data terminal $D_+$ has heavy pollution at itself in accordance with the present invention.

FIG. 7A shows the waveforms of the signals $V_+$ and $V_-$ in FIG. 6 when the signal $V_+$ at the data terminal $D_+$ includes a voltage level shift and the data terminal $D_+$ has no pollution at itself in accordance with the present invention.

FIG. 7B shows the waveforms of the signals $V_+$ and $V_-$ in FIG. 6 when the signal $V_+$ at the data terminal $D_+$ includes the voltage level shift and the data terminal $D_+$ has slight pollution at itself in accordance with the present invention.

FIG. 7C shows the waveforms of the signals $V_+$ and $V_-$ in FIG. 6 when the signal $V_+$ at the data terminal $D_+$ includes the voltage level shift and the data terminal $D_+$ has heavy pollution at itself in accordance with the present invention.

DETAILED DESCRIPTION OF EMBODIMENTS

Figure 1:
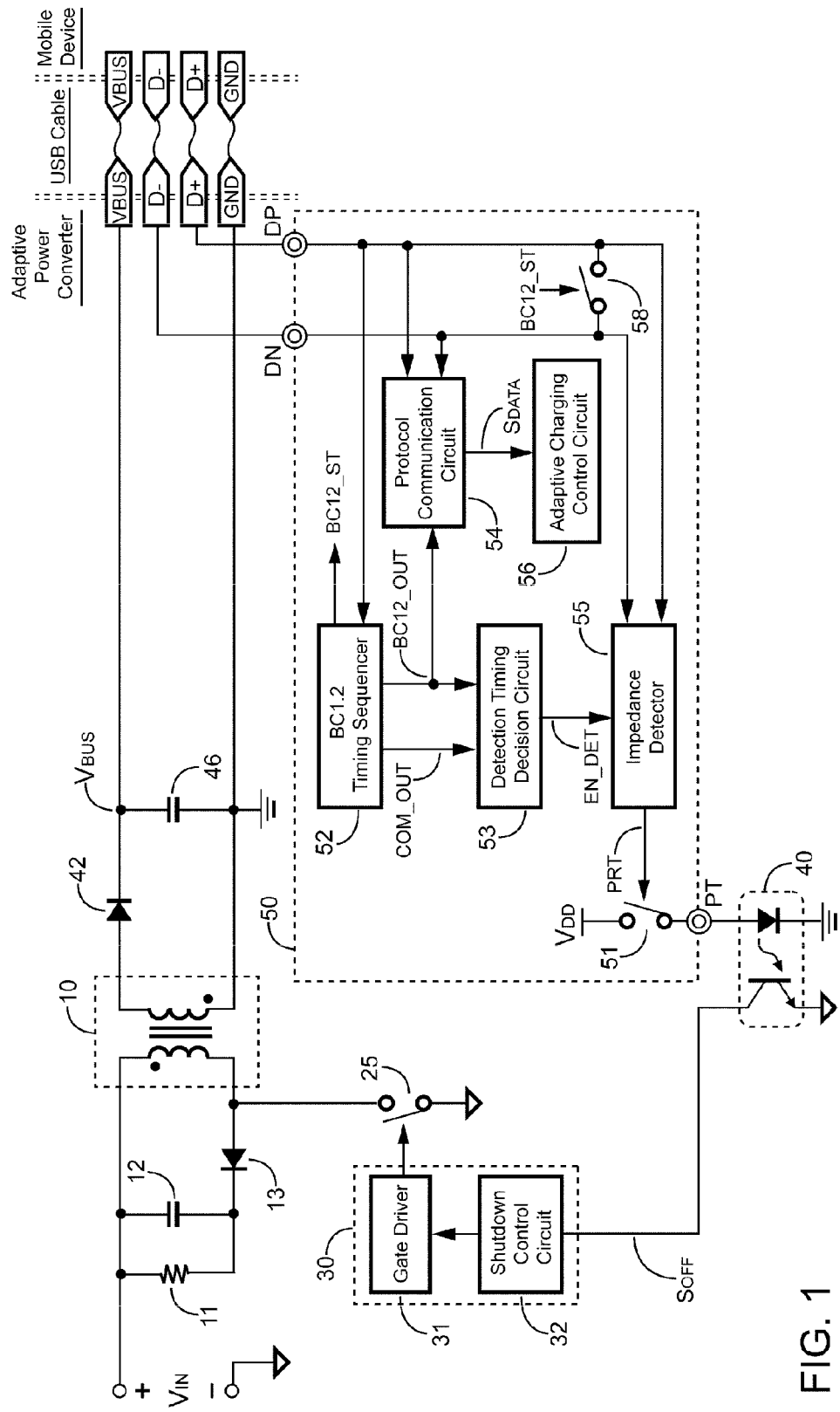
FIG. 1 shows a circuit diagram of an embodiment of an adaptive power converter in accordance with the present invention.

FIG. 1 shows a circuit diagram of an embodiment of an adaptive power converter in accordance with the present invention. As shown in FIG. 1, the adaptive power converter comprises a transformer 10 including a primary winding and a secondary winding. A first terminal of the primary winding of the transformer 10 is coupled to receive an input voltage $V_{IN}$ of the adaptive power converter. A switch 25 is coupled between a second terminal of the primary winding of the transformer 10 and a ground. The switch 25 is coupled to switch the transformer 10 for transferring a power from the primary winding to the secondary winding. A resistor 11, a capacitor 12, and a diode 13 are coupled to the primary winding. The secondary winding generates a bus voltage $V_{BUS}$ across an output capacitor 46 via a rectifier 42. Once the transformer 10 is switched, the power is transferred from the primary winding to the secondary winding, and the bus voltage $V_{BUS}$ is therefore generated.

A switching controller 30 is coupled to control the switch 25 for switching the transformer 10. The switching controller 30 comprises a gate driver 31 and a shutdown control circuit 32. The gate driver 31 drives the switch 25. The shutdown control circuit 32 is coupled to control the gate driver 31. Once a protection signal PRT is enabled, the shutdown control circuit 32 will control the gate driver 31 to shutdown the adaptive power converter for protecting the adaptive power converter.

The adaptive power converter has four terminals which are a bus power terminal VBUS, data terminals $D_+$ and $D_-$, and a ground terminal GND. The terminals VBUS and GND are respectively coupled to two terminals of the secondary winding. A mobile device also has four terminals VBUS, $D_+$, $D_-$, and GND to couple to the adaptive power converter via a cable, such as an USB cable having four lines (a bus power line, two data lines, and a ground line) connecting the four terminals of the adaptive power converter and the four terminals of the mobile device. The adaptive power converter supplies the power to the mobile device via the bus power and ground terminals of the both and the bus power line and the ground line of the USB cable. The mobile device transmits the instructions/signals to the adaptive power converter via the data terminals $D_+$ and $D_-$. The adaptive power converter will responsively supply the requested power level to the mobile device according to the instructions/signals.

The adaptive power converter further comprises a control circuit 50 which comprises two input terminals DP and DN and a protection terminal PT. The input terminals DP and DN are coupled to the data terminals $D_+$ and $D_-$, respectively, to receive the instructions/signals. The control circuit 50 comprises a BC1.2 (Battery Charging Specification Revision 1.2) timing sequencer 52, a detection timing decision circuit 53, a protocol communication circuit 54, an impedance detector 55, and an adaptive charging control circuit 56. The BC1.2 timing sequencer 52 is coupled to the data terminal $D_+$ via the input terminal DP to receive and detect the signal at the data terminal $D_+$ for confirming the attachment of the mobile device to the adaptive power converter. BC1.2 timing sequencer 52 generates a BC1.2 output signal BC12_OUT and a comparison output signal COM_OUT in response to the signal at the data terminal $D_+$.

The protocol communication circuit 54 is coupled to the BC1.2 timing sequencer 52 to receive the BC1.2 output signal BC12_OUT. The protocol communication circuit 54 is further coupled to the data terminals $D_+$ and $D_-$ via the input terminals DP and DN, respectively, to receive the instructions/signals. The protocol communication circuit 54 generates an instruction data $S_{DATA}$ in response to the BC1.2 output signal BC12_OUT and the instructions/signals from the data terminals $D_+$ and $D_-$. The adaptive charging control circuit 56 is coupled to the protocol communication circuit 54 to receive the instruction data $S_{DATA}$ for varying the bus voltage $V_{BUS}$. The control circuit 50 will then change the output voltage (the bus voltage $V_{BUS}$) of the adaptive power converter in response to the output of the adaptive charging control circuit 56. That is, the bus voltage $V_{BUS}$ is adaptively changed via varying the reference voltage of a conventional shunt regulator at the secondary side of the adaptive power converter, such as TL431, by the adaptive charging control circuit 56 (not shown).

The detection timing decision circuit 53 is coupled to the BC1.2 timing sequencer 52 to receive the BC1.2 output signal BC12_OUT and the comparison output signal COM_OUT for generating a detection enabling signal EN_DET. The impedance detector 55 is coupled to the detection timing decision circuit 53 to receive the detection enabling signal EN_DET. The impedance detector 55 is further coupled to the data terminals $D_+$ and $D_-$ via the input terminals DP and DN, respectively.

Figure 4:
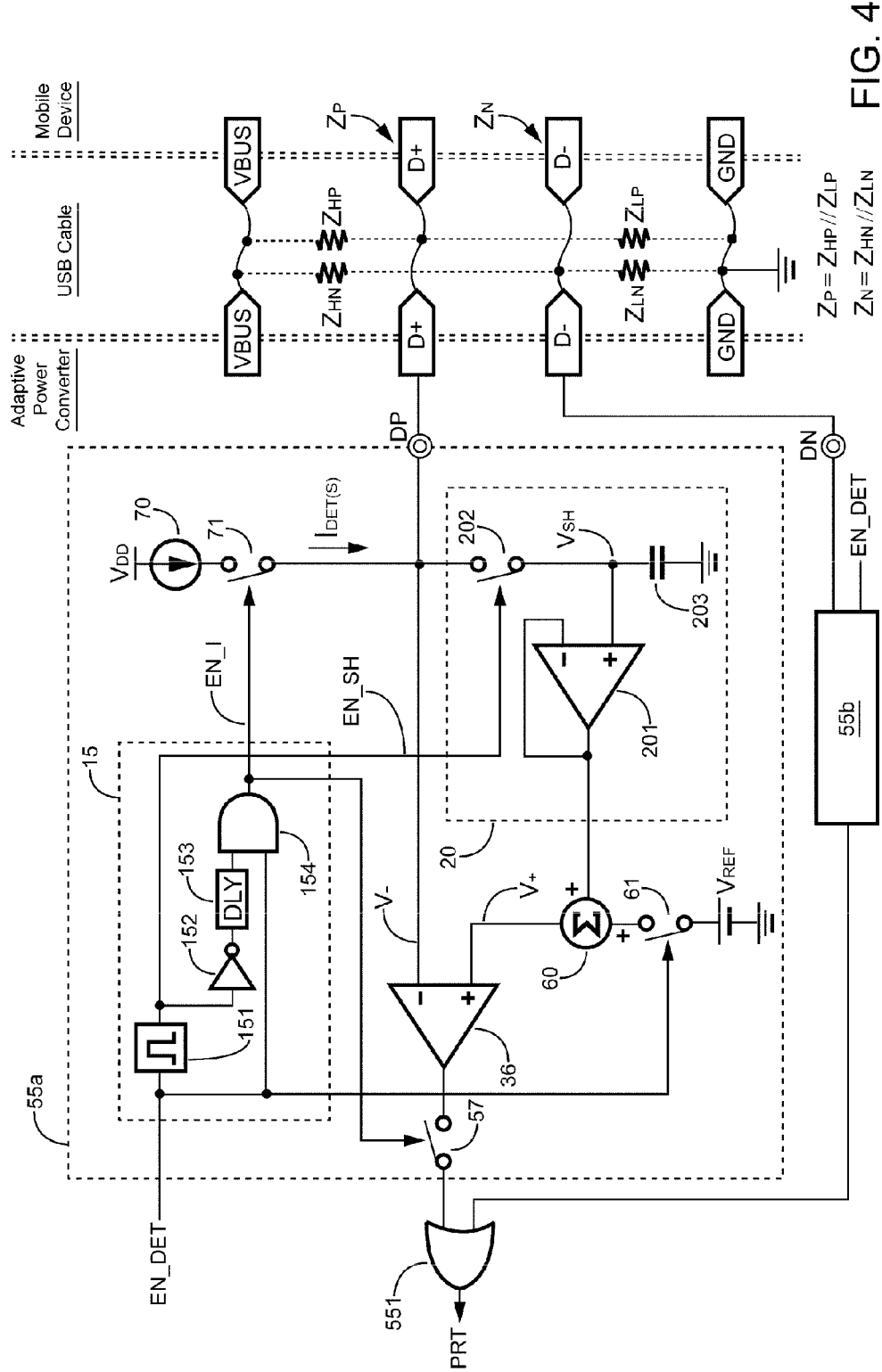
FIG. 4 shows a circuit diagram of an embodiment of an impedance detector of the control circuit in accordance with the present invention.

Now referring to FIG. 4, the pollution occurring between the data terminal $D_+$ and the bus power terminal VBUS is denoted as an impedance $Z_{HP}$. The pollution occurring between the data terminal $D_+$ and the ground terminal GND is denoted as an impedance $Z_{LP}$. The pollution occurring between the data terminal $D_-$ and the bus power terminal VBUS is denoted as an impedance $Z_{HN}$. The pollution occurring between the data terminal $D_-$ and the ground terminal GND is denoted as an impedance $Z_{LN}$. As a result, once the detection enabling signal EN_DET is enabled, the impedance detector 55 detects an equivalent impedance $Z_P$ at the data terminal $D_+$ or the equivalent impedance $Z_N$ at the data terminal $D_-$. As the following equations (1) and (2) show, the equivalent impedance $Z_P$ is formed by connecting the impedance $Z_{HP}$ and the impedance $Z_{LP}$ in parallel. The equivalent impedance $Z_N$ is formed by connecting the impedance $Z_{HN}$ and the impedance $Z_{LN}$ in parallel.

$$Z_P = Z_{HP} // Z_{LP} \qquad (1)$$

$$Z_N = Z_{HN} // Z_{LN} \qquad (2)$$

The impedances $Z_{HP}$, $Z_{LP}$, $Z_{HN}$, and $Z_{LN}$ are caused by electric conductive particles existing among the data terminals $D_+$, $D_-$ and the bus power terminal VBUS and the ground terminal GND. When the equivalent impedances $Z_P$ and $Z_N$ are high enough, the communication over the data terminals $D_+$ and $D_-$ or the data lines of the USB cable might still work normally. However, if the equivalent impedances $Z_P$ and $Z_N$ are too low to cause biased communication over the data terminals $D_+$ and $D_-$ or the data lines of the USB cable, the pollution as aforementioned should be detected in advance. Once the pollution is confirmed by the impedance detector 55, it will generate the protection signal PRT to shutdown the adaptive power converter, in an embodiment of the present invention, to avoid biased communication between the mobile device and the adaptive power converter to secure safety. As above mentioned, the control circuit 50 is operated as a pollution detection circuit for detecting the pollution occurring at the data terminals $D_+$ and $D_-$ or the data lines of the USB cable.

Referring to FIG. 1, the protection signal PRT is utilized to control a switch 51. The switch 51 is coupled between a supply voltage $V_{DD}$ and the protection terminal PT of the control circuit 50. An optical-coupler 40 is coupled between the protection terminal PT and the shutdown control circuit 32 of the switching controller 30. Once the protection signal PRT is enabled, the switch 51 is turned on and the optical-coupler 40 generates a shutdown signal $S_{OFF}$ in response to the supply voltage $V_{DD}$ for controlling the shutdown control circuit 32 to shutdown the adaptive power converter. Furthermore, a switch 58 controlled by a switching signal BC12_ST is coupled between the input terminals DP and DN. The switching signal BC12_ST is generated by the BC1.2 timing sequencer 52 as the adaptive power converter is powered on according to an embodiment of the present invention.

Figure 2:
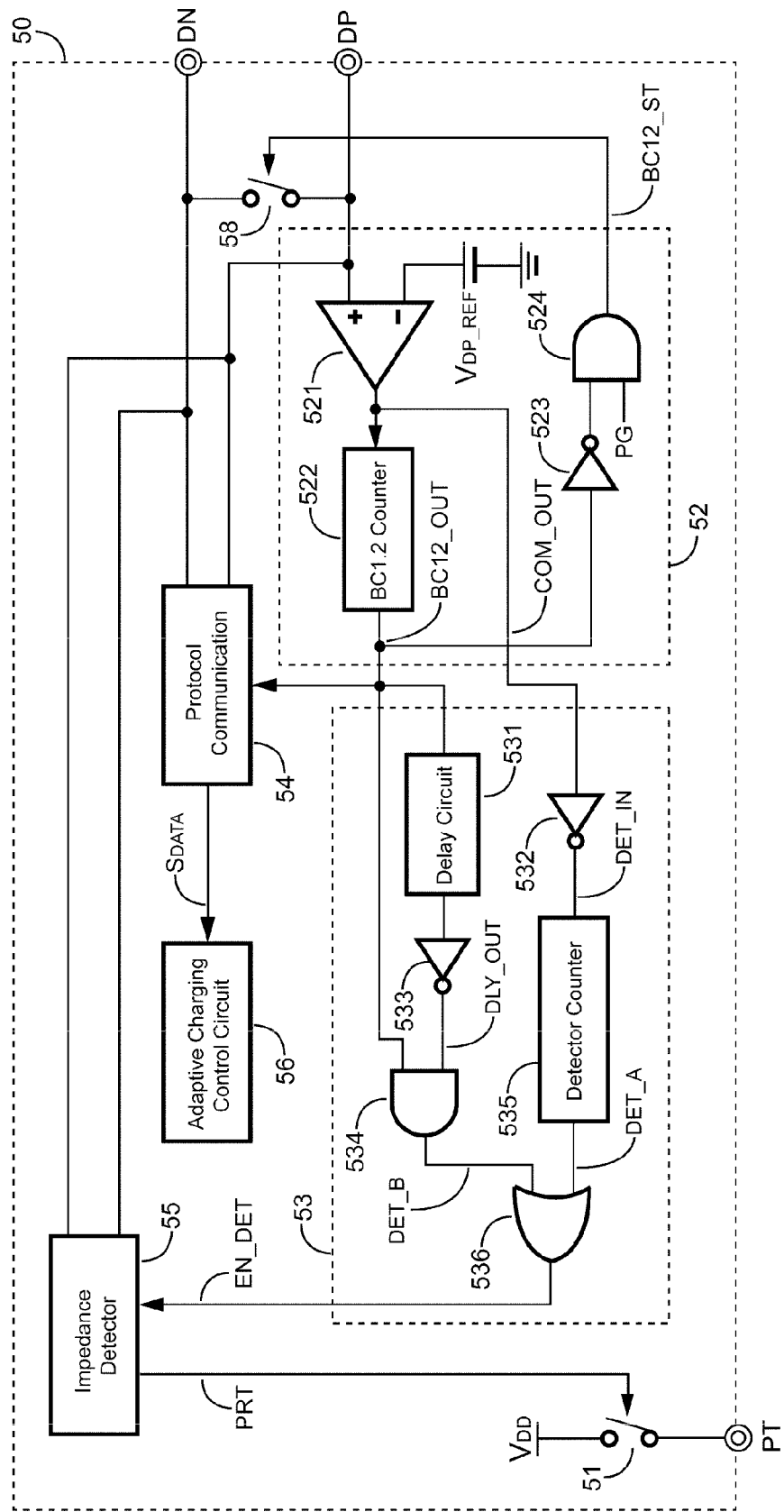
FIG. 2 shows a circuit diagram of an embodiment of a control circuit of the adaptive power converter in accordance with the present invention.

FIG. 2 shows a circuit diagram of an embodiment of the control circuit 50 in accordance with the present invention. As shown in FIG. 2, the BC1.2 timing sequencer 52 of the control circuit 50 comprises a comparator 521, a BC1.2 counter 522, an inverter 523 and an AND gate 524. A positive input terminal of the comparator 521 is coupled to the input terminal DP to receive the signal at the data terminal $D_+$ (as shown in FIG. 1). A negative input terminal of the comparator 521 is supplied with a reference signal $V_{DP\_REF}$. Once the level of the signal at the data terminal $D_+$ is higher than the level of the reference signal $V_{DP\_REF}$, the level of the comparison output signal COM_OUT will become logic high (enabled).

Figure 3:
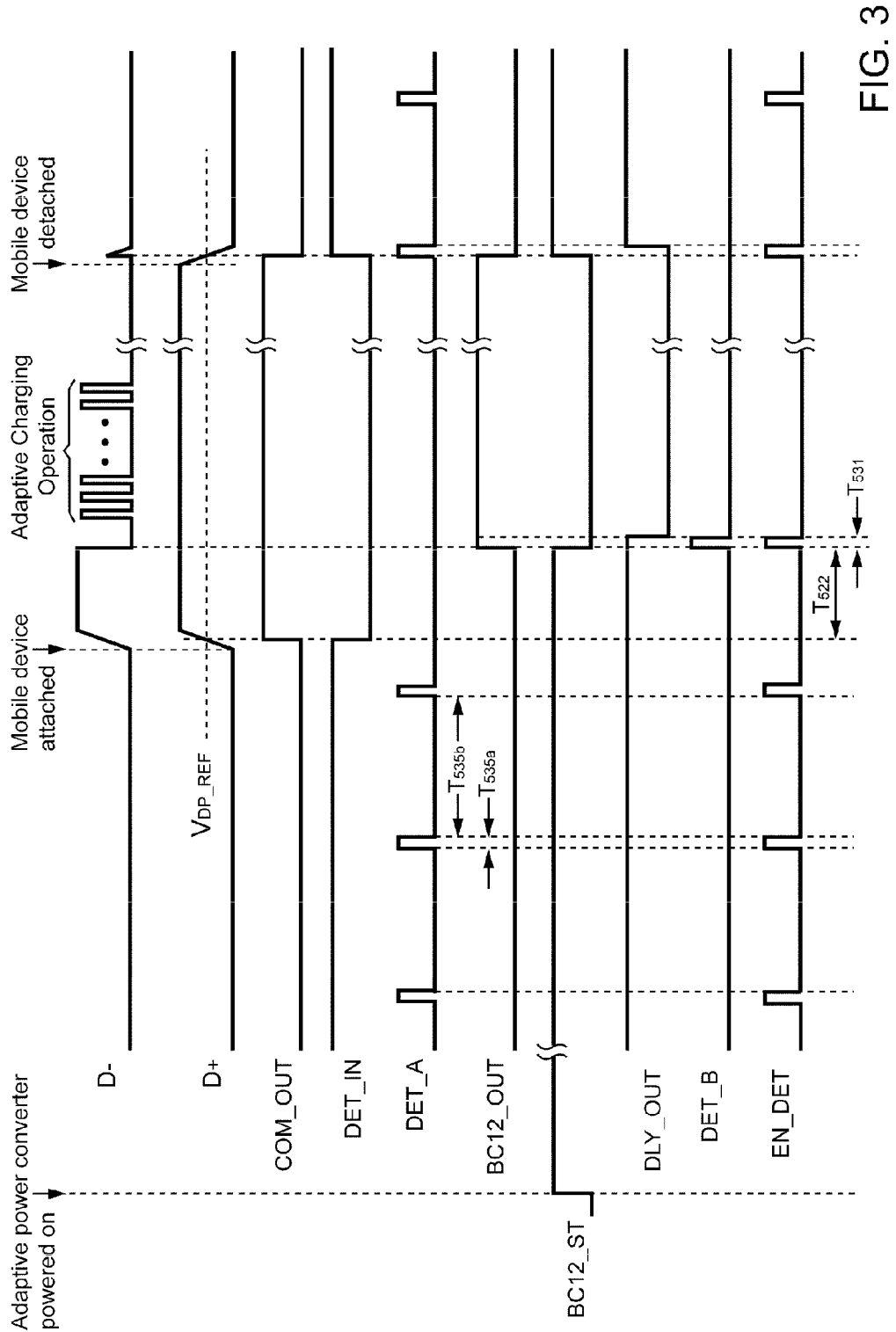
FIG. 3 shows a timing sequence diagram of the signals of the control circuit in accordance with the present invention.

The BC1.2 counter 522 is coupled to an output terminal of the comparator 521 to receive the comparison output signal COM_OUT. The BC1.2 counter 522 starts to count a counted time $T_{522}$ (as shown in FIG. 3), for example 1.5 seconds, when the comparison output signal COM_OUT is enabled. The BC1.2 counter 522 generates the BC1.2 output signal BC12_OUT. The level of the BC1.2 output signal BC12_OUT becomes logic high when the BC1.2 counter 522 completes the count. An input terminal of the inverter 523 is supplied with the BC1.2 output signal BC12_OUT. An output terminal of the inverter 523 is connected to an input terminal of the AND gate 524. The other input terminal of the AND gate 524 is supplied with a power-good signal PG which becomes logic high when the adaptive power converter is powered on. An output terminal of the AND gate 524 generates the switching signal BC12_ST to control the switch 58. Therefore, the switching signal BC12_ST becomes logic high to turn on the switch 58 when the adaptive power converter is powered on and becomes logic low to turn off the switch 58 when the counted time $T_{522}$ has elapsed.

The detection timing decision circuit 53 comprises a delay circuit 531, inverters 532, 533, an AND gate 534, a detector counter 535, and an OR gate 536. The inverter 532 is coupled to the output terminal of the comparator 521 to receive the comparison output signal COM_OUT. The detector counter 535 generates a first detection signal DET_A in response to the comparison output signal COM_OUT. Once the level of the signal at the data terminal $D_+$ is lower than the level of the reference signal $V_{DP\_REF}$, the level of the comparison output signal COM_OUT will be logic low. The detector counter 535 is activated to periodically generate the first detection signal DET_A having a plurality of pulses with an on-time $T_{535a}$ and an off-time $T_{535b}$ (shown in FIG. 3) whenever the comparison output signal COM_OUT is logic low. The off-time $T_{535b}$ of the first detection signal DET_A is determined for power saving purpose, for example 2 seconds, according to an embodiment of the present invention.

An input terminal of the delay circuit 531 receives the BC1.2 output signal BC12_OUT from the BC1.2 counter 522 for delaying the BC1.2 output signal BC12_OUT. The inverter 533 is coupled between an output terminal of the delay circuit 531 and a first input terminal of the AND gate 534. The inverter 533 inverts the delayed BC1.2 output signal BC12_OUT to generate a delayed output signal DLY_OUT. The waveform of the delayed output signal DLY_OUT is shown in FIG. 3. A second input terminal of the AND gate 534 is coupled to the BC1.2 counter 522 to receive the BC1.2 output signal BC12_OUT. The AND gate 534 generates a second detection signal DET_B in response to the delayed output signal DLY_OUT. Since the delayed output signal DLY_OUT is generated in response to the BC1.2 output signal BC12_OUT, the second detection signal DET_B is also generated in response to the BC1.2 output signal BC12_OUT.

Referring to FIG. 2 and FIG. 3, the second detection signal DET_B is enabled (logic high) when two input terminals of the AND gate 534, which are the BC1.2 output signal BC12_OUT and the delayed output signal DLY_OUT, are both logic high. As the level of the signal at the data terminal $D_+$ is higher than the level of the reference signal $V_{DP\_REF}$, the level of the comparison output signal COM_OUT will responsively become logic high. The BC1.2 output signal BC12_OUT will become logic high in response to the rising edge of the comparison output signal COM_OUT after the counted time $T_{522}$ has elapsed. Since the BC1.2 output signal BC12_OUT will be delayed by the delay circuit 531 to occur at the output terminal of the delay circuit 531 after its delay time $T_{531}$, the delayed output signal DLY_OUT will not turn to logic low via the inverter 533 to turn the second detection signal DET_B to logic low unless the delay time $T_{531}$ has elapsed. The enabled time of the second detection signal DET_B is therefore determined by the delay time $T_{531}$ of the delay circuit 531. Two input terminals of the OR gate 536 are supplied with the second detection signal DET_B and the first detection signal DET_A for generating the detection enabling signal EN_DET. As a result, the detection enabling signal EN_DET can be generated in response to the first detection signal DET_A or the second detection signal DET_B. As above mentioned, the control circuit 50 generates the detection enabling signal EN_DET in response to the level of the signal at the data terminal $D_+$. That is, the detection enabling signal EN_DET generated by the control circuit 50 is correlated to the level of the signal at the data terminal $D_+$.

Once the mobile device is not attached to the adaptive power converter, the level of the signal at the data terminal $D_+$ will be kept at logic low. Therefore, the control circuit 50 periodically enables the detection enabling signal EN_DET for activating the impedance detector 55 to periodically detect the pollution at the data terminals $D_+$ and $D_-$. The pollution detection performed here is during which the mobile device is being not attached to the adaptive power converter.

Once the mobile device is attached to the adaptive power converter, the mobile device will transmit a signal at logic high via the data terminal $D_+$. Since the switching signal BC12_ST has been enabled, the level of the signal at the data terminal $D_-$ will follow the level of the signal at the data terminal $D_+$ because the switch 58 has been turned on to make the data terminals $D_+$ and $D_-$ short circuited. Next, the control circuit 50 enables the detection enabling signal EN_DET (after the counted time $T_{522}$ of the BC1.2 counter 522) for one time (during the delay time $T_{531}$) when the level of the signal at the data terminal $D_+$ is still kept logic high. The impedance detector 55 is therefore activated for one time in response to the detection enabling signal EN_DET to detect the pollution at the data terminals $D_+$ and $D_-$. As the BC1.2 output signal BC12_OUT becomes logic high, the switching signal BC12_ST will be disabled to turn off the switch 58 in FIG. 2. This will make the data terminal $D_+$ and the data terminal $D_-$ open circuited. The waveform of the signal at the data terminal $D_-$ will no more follow that at the data terminal $D_+$. Therefore, the level of the signal at the data terminal $D_-$ will turn to logic low again. The pollution detection performed here is during which the mobile device is still being attached to the adaptive power converter. Once there is no pollution detected, the mobile device will transmit its instructions/signals via the data terminal $D_-$ to the adaptive power converter for performing adaptive charging operation. It is to be noted that during the counted time $T_{522}$ of the BC1.2 counter 522, the mobile device is recognizing the types of the charging devices being attached to itself, for example, an adaptive power converter.

FIG. 4 shows a circuit diagram of an embodiment of the impedance detector 55 in FIG. 1 in accordance with the present invention. As shown in FIG. 4, the impedance detector 55 comprises a first impedance detection circuit 55a, a second impedance detection circuit 55b and an OR gate 551. The first impedance detection circuit 55a is coupled to the input terminal DP for detecting the pollution at the data terminal $D_+$. The second impedance detection circuit 55b is coupled to the input terminal DN for detecting the pollution at the data terminal $D_-$. The circuit of the second impedance detection circuit 55b is identical as the circuit of the first impedance detection circuit 55a.

The first impedance detection circuit 55a comprises a time sequencer 15, a sample-hold circuit 20, an operation unit 60, a switch 61, a reference signal $V_{REF}$, a comparator 36, a switch 57, and a current generation circuit comprising a current source 70 and a switch 71. The time sequencer 15 comprises a pulse generator 151, an inverter 152, a delay circuit (DLY) 153 and an AND gate 154. The time sequencer 15 is coupled to receive the detection enabling signal EN_DET for generating a first enabling signal EN_SH, a second enabling signal EN_I and a delay time $t_{153}$ intervened therebetween.

As shown in FIG. 5A~5F, once the detection enabling signal EN_DET is enabled, the first enabling signal EN_SH is synchronously enabled as the detection enabling signal EN_DET is enabled. The second enabling signal EN_I is synchronously disabled as the detection enabling signal EN_DET is disabled. The delay time $t_{153}$ is inserted between a falling-edge (disabling) of the first enabling signal EN_SH and the rising-edge (enabling) of the second enabling signal EN_I. The delay time $t_{153}$ is determined by the delay circuit 153. The delay time $t_{153}$ can equal to zero according to one embodiment of the present invention.

Referring to FIG. 4, the switch 71 is controlled by the second enabling signal EN_I and coupled between the current source 70 and the input terminal DP. The current source 70 is coupled to the supply voltage $V_{DD}$ for providing a detection current $I_{DET(S)}$ to the data terminal $D_+$ via the switch 71 and the input terminal DP for detecting the pollution occurring at the data terminal $D_+$. The sample-hold circuit 20 comprises an operational amplifier 201, a switch 202, and a capacitor 203. The switch 202 is controlled by the first enabling signal EN_SH and coupled between the input terminal DP and a first terminal of the capacitor 203. A second terminal of the capacitor 203 is coupled to the ground. The signal $V_-$ at the data terminal $D_+$ charges up the capacitor 203 via the input terminal DP and the switch 202 to generate a sample signal $V_{SH}$ across the capacitor 203 when the switch 202 is turned on by the first enabling signal EN_SH. Therefore, the sample-hold circuit 20 is activated by the time sequencer 15 to sample and hold the signal at the data terminal $D_+$. The level of the sample signal $V_{SH}$ is therefore correlated to the level of the signal at the data terminal $D_+$. A positive input terminal of the operational amplifier 201 is coupled to the first terminal of the capacitor 203 to receive the sample signal $V_{SH}$. A negative input terminal of the operational amplifier 201 is coupled to an output terminal of the operational amplifier 201. The operational amplifier 201 serves as a buffer.

The switch 61 is coupled between the reference signal $V_{REF}$ and an input terminal of the operation unit 60. Another input terminal of the operation unit 60 is coupled to the output terminal of the operational amplifier 201. The operation unit 60 adds up the reference signal $V_{REF}$ and the sample signal $V_{SH}$ to generate a signal $V_+$ at an output terminal thereof. The operation unit 60 serves as an adder, and the signal $V_+$ serves as a compared signal in this embodiment. A positive input terminal of the comparator 36 is coupled to the output terminal of the operation unit 60 to receive the signal $V_+$. A negative input terminal of the comparator 36 is coupled to the input terminal DP to receive the signal $V_-$ at the data terminal $D_+$. The comparator 36 compares the signals $V_+$ and $V_-$.

The switch 57 controlled by the second enabling signal EN_I is coupled between an output terminal of the comparator 36 and a first input terminal of the OR gate 551. Therefore, an output signal of the comparator 36, which is also the output signal of the first impedance detection circuit 55a, is coupled to the first input terminal of the OR gate 551. A second input terminal of the OR gate 551 is coupled to the second impedance detection circuit 55b to receive an output signal of the second impedance detection circuit 55b. The OR gate 551 generates the protection signal PRT at its output terminal in response to the output signal of the first impedance detection circuit 55a or the output signal of the second impedance detection circuit 55b. That is, the adaptive power converter can be shut down by enabling the protection signal PRT whenever the pollution is detected by the first impedance detection circuit 55a at the data terminal $D_+$ or the second impedance detection circuit 55b at the data terminal $D_-$.

FIG. 5A shows the waveforms of the signals $V_+$ and $V_-$ in FIG. 4 when the signal $V_-$ at the data terminal $D_+$ includes a voltage level shift and the data terminal $D_+$ has no pollution at itself in accordance with the present invention. The voltage level shift is resulted from the impedance $Z_{HP}$ existed between the data terminal $D_+$ and the bus power terminal VBUS. As shown in FIG. 5A, the first enabling signal EN_SH is enabled when the detection enabling signal EN_DET is enabled. Once the first enabling signal EN_SH is enabled, the second enabling signal EN_I is disabled, and vice versa. Referring to FIG. 4, the switch 202 is turned on by the first enabling signal EN_SH, and the signal $V_-$ at the data terminal $D_+$ is sampled as the sample signal $V_{SH}$ across the capacitor 203. The operation unit 60 adds up the reference signal $V_{REF}$ and the sample signal $V_{SH}$ to generate the signal $V_+$. The waveforms of the signals $V_+$ and $V_-$ are shown in FIG. 5A. Once the first enabling signal EN_SH is enabled, the bus voltage $V_{BUS}$ will charge the capacitor 203 via the impedance $Z_{HP}$, the data terminal $D_+$ and the input terminal DP. The level of the signal $V_+$ will start to ramp up from the level of the reference signal $V_{REF}$ once the first enabling signal EN_SH is enabled. The level of the signal $V_+$ will remain higher than the level of the signal $V_-$ till the second enabling signal EN_I is enabled. Next, when the first enabling signal EN_SH is disabled, the second enabling signal EN_I will be enabled (as shown in FIG. 5A) after the delay time $t_{153}$. This will turn off the switch 202 and turn on the switches 57 and 71. The detection current $I_{DET(S)}$ will flow outward the data terminal $D_+$ via the input terminal DP. The level at the data terminal $D_+$, which is also the level of the signal $V_-$, will be pulled up to the level of the supply voltage $V_{DD}$ because the data terminal $D_+$ has no pollution at itself. That is, the equivalent impedance $Z_P$ at the data terminal $D_+$ formed by the impedance $Z_{HP}$ and $Z_{LP}$ is very high. High impedance means there is no particle existing among the data terminal $D_+$ and the terminals VBUS and GND to cause pollution. Referring to FIG. 5A, the level of the signal $V_-$ is higher than the level of the signal $V_+$ during which the second enabling signal EN_I is enabled. No pollution is detected and the protection signal PRT is disabled.

As above mentioned, the time sequencer 15 activates the sample-hold circuit 20 to sample and hold the signal at the data terminal $D_+$ and deactivates the current generation circuit not to provide the detection current $I_{DET(S)}$, then the time sequencer 15 deactivates the sample-hold circuit 20 and activates the current generation circuit to provide the detection current $I_{DET(S)}$ for detecting the pollution in response to the level of the signal $V_-$ at the data terminal $D_+$ and the level of the signal $V_+$ correlated to the level of the sample signal $V_{SH}$.

FIG. 5B shows the waveforms of the signals $V_+$ and $V_-$ in FIG. 4 when the signal $V_-$ at the data terminal $D_+$ includes a voltage level shift and the data terminal $D_+$ has slight pollution at itself in accordance with the present invention. The voltage level shift is resulted from the impedance $Z_{HP}$ existed between the data terminal $D_+$ and the bus power terminal VBUS. The level at the data terminal $D_+$, which is also the level of the signal $V_-$, will be pulled to a voltage level slightly lower than the level of the supply voltage $V_{DD}$ because the data terminal $D_+$ has slight pollution at itself. That is, the equivalent impedance $Z_P$ at the data terminal $D_+$ formed by the impedance $Z_{HP}$ and $Z_{LP}$ will be reduced slightly. The slightly reduced impedance here means that there exist certain particles among the data terminal $D_+$ and the terminals VBUS and GND to cause slight pollution. However, this slight pollution is not capable of biasing the levels of the signals at the data terminals $D_+$ and $D_-$ or the data lines of the USB cable. As shown in FIG. 5B, the level of the signal $V_-$ is slightly lower than the level of the supply voltage $V_{DD}$ but still higher than the level of the signal $V_+$ during which the second enabling signal EN_I is enabled. A slight pollution is detected but the protection signal PRT is still disabled.

FIG. 5C shows the waveforms of the signals $V_+$ and $V_-$ in FIG. 4 when the signal $V_-$ at the data terminal $D_+$ includes a voltage level shift and the data terminal $D_+$ has heavy pollution at itself in accordance with the present invention. The voltage level shift is resulted from the impedance $Z_{HP}$ existed between the data terminal $D_+$ and the bus power terminal VBUS. The level at the data terminal $D_+$, which is also the level of the signal $V_-$, will be pulled down to a voltage level significantly lower than the level of the supply voltage $V_{DD}$ because the data terminal $D_+$ has heavy pollution at itself. That is, the equivalent impedance $Z_P$ at the data terminal $D_+$ formed by the impedance $Z_{HP}$ and $Z_{LP}$ is significantly low. Low impedance means that there exist certain particles among the data terminal $D_+$ and the terminals VBUS and GND to cause heavy pollution. This heavy pollution is capable of biasing the levels of the signals at the data terminals $D_+$ and $D_-$ or the data lines of the USB cable. As shown in FIG. 5C, the level of the signal $V_-$ is now lower than the level of the signal $V_+$ during which the second enabling signal EN_I is enabled. Thus, the protection signal PRT is enabled to control the switching controller 30 (as shown in FIG. 1) to shutdown the adaptive power converter.

FIG. 5D~5F show the waveforms of the signals $V_+$ and $V_-$ in FIG. 4 when the signal $V_-$ at the data terminal $D_+$ excludes any voltage level shift and the data terminal $D_+$ has no pollution, slight pollution, and heavy pollution, at itself respectively, in accordance with the present invention. The voltage level shift does not exist in FIG. 5D~5F because the impedance $Z_{HP}$ between the data terminal $D_+$ and the bus power terminal VBUS doesn't exist therebetween during which the first enabling signal EN_SH is enabled. The operations in FIG. 5D and FIG. 5E are similar with the FIG. 5A and FIG. 5B except the voltage level shift is excluded therefore will be omitted herein. Referring to FIG. 5F (heavy pollution), the level of the signal $V_-$ is significantly lower than the level of the signal $V_+$ as the detection current $I_{DET(S)}$ (as shown in FIG. 4) flows outward the data terminal $D_+$ via the input terminal DP. Since the impedance $Z_{LP}$ at the data terminal $D_+$ is significantly low, the voltage at the data terminal $D_+$ will be pulled down to be lower than the level of the signal $V_+$. Thus, the protection signal PRT is enabled to control the switching controller 30 (as shown in FIG. 1) to shutdown the adaptive power converter.

Figure 6:
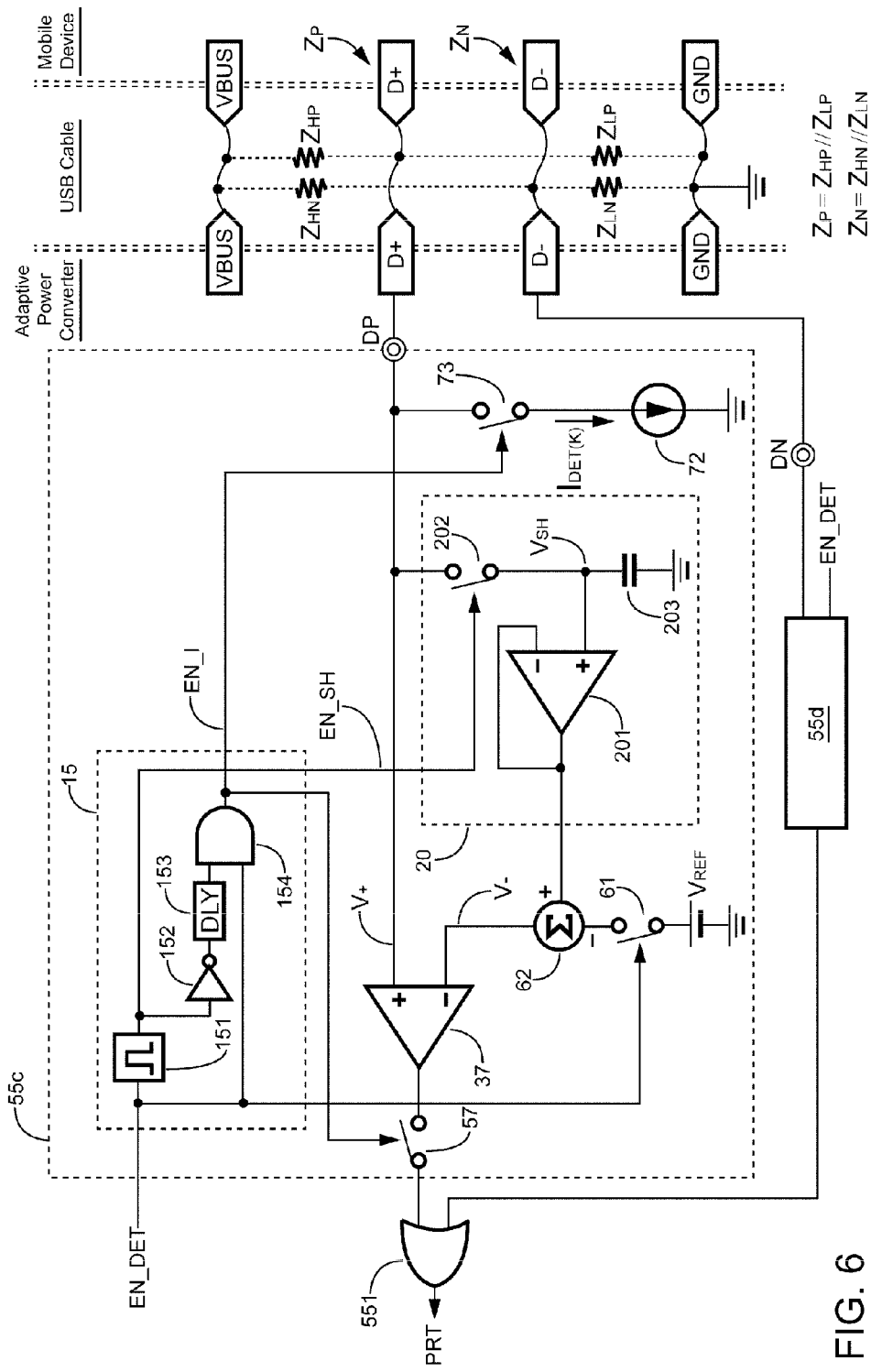
FIG. 6 shows a circuit diagram of another embodiment of the impedance detector of the control circuit in accordance with the present invention.

FIG. 6 shows a circuit diagram of another embodiment of the impedance detector 55 in FIG. 1 in accordance with the present invention. As shown in FIG. 6, the impedance detector 55 comprises a first impedance detection circuit 55c, a second impedance detection circuit 55d and the OR gate 551. The first impedance detection circuit 55c is coupled to the input terminal DP for detecting the pollution at the data terminal $D_+$. The second impedance detection circuit 55d is coupled to the input terminal DN for detecting the pollution at the data terminal $D_-$. The circuit of the second impedance detection circuit 55d is identical as the circuit of the first impedance detection circuit 55c. The first impedance detector 55c comprises the time sequencer 15, the sample-hold circuit 20, the switch 61, the reference signal $V_{REF}$, an operation unit 62, a comparator 37, the switch 57, and a current generation circuit comprising a current sink 72 and a switch 73.

The switch 73 is coupled between the input terminal DP and a first terminal of the current sink 72. A second terminal of the current sink 72 is further coupled to the ground. The current sink 72 provides a detection current $I_{DET(K)}$. The detection current $I_{DET(K)}$ is utilized to sink the current flowing inward the input terminal DP from the data terminal $D_+$ for detecting the pollution at the data terminal $D_+$.

The operation unit 62 is coupled to the output terminal of the operational amplifier 201 of the sample-hold circuit 20.

The operation unit 62 generates the signal $V_-$ by subtracting the level of reference signal $V_{REF}$ from the level of the sample signal $V_{SH}$. The operation unit 62 serves as a subtractor, and the signal $V_-$ serves as a compared signal in this embodiment. A negative input terminal of the comparator 37 is coupled to an output terminal of the operation unit 62 to receive the signal $V_-$. A positive input terminal of the comparator 37 is coupled to the input terminal DP to receive the signal $V_+$ at the data terminal $D_+$. The comparator 37 compares the signals $V_+$ and $V_-$. The output signals of the first impedance detection circuit 55c and the second impedance detection circuit 55d are supplied to the two input terminals of the OR gate 551. Once the pollution is detected by the first impedance detection circuit 55c at the data terminal $D_+$ or the second impedance detection circuit 55d at the data terminal $D_-$, the protection signal PRT will be enabled to shut down the adaptive power converter.

FIG. 7A shows the waveforms of the signals $V_+$ and $V_-$ in FIG. 6 when the signal $V_+$ at the data terminal $D_+$ includes a voltage level shift and the data terminal $D_+$ has no pollution at itself in accordance with the present invention. The voltage level shift is resulted from the impedance $Z_{HP}$ existed between the data terminal $D_+$ and the bus power terminal VBUS. As shown in FIG. 7A, the first enabling signal EN_SH is enabled when the detection enabling signal EN_DET is enabled. The level of the signal $V_-$ will start to ramp up from a negative level of the reference signal $V_{REF}$ once the first enabling signal EN_SH is enabled. Referring to FIG. 6, the switch 202 is turned on by the first enabling signal EN_SH to sample the signal $V_+$ at the data terminal $D_+$ as the sample signal $V_{SH}$ across the capacitor 203. The operation unit 62 generates the signal $V_-$ in response to the reference signal $V_{REF}$ and the sample signal $V_{SH}$. The level of the signal $V_-$ is determined by subtracting the level of the reference signal $V_{REF}$ from the level of the sample signal $V_{SH}$. The waveforms of the signals $V_+$ and $V_-$ are shown in FIG. 7A. The level of the signal $V_+$ will remain higher than the level of the signal $V_-$ till the second enabling signal EN_I is enabled.

Next, when the first enabling signal EN_SH is disabled, the second enabling signal EN_I will be enabled after the delay time $t_{153}$. This will turn off the switch 202 and turn on the switches 57 and 73. The detection current $I_{DET(K)}$ is provided to sink the current flowing inward the input terminal DP from the data terminal $D_+$. The level of the signal $V_+$ at the data terminal $D_+$ will be pulled down to the level of the ground because the data terminal $D_+$ has no pollution at itself. That is, the equivalent impedance $Z_P$ at the data terminal $D_+$ formed by the impedance $Z_{HP}$ and $Z_{LP}$ is very high. High impedance means there is no particle existing among the data terminal $D_+$ and the terminals VBUS and GND to cause pollution. Referring to FIG. 7A, the level of the signal $V_+$ is pulled down to the level of the ground during which the second enabling signal EN_I is enabled. Therefore, the level of the signal $V_-$ is higher than the level of the signal $V_+$ when the data terminal $D_+$ has no pollution at itself. Thus, the protection signal PRT is disabled.

FIG. 7B shows the waveforms of the signals $V_+$ and $V_-$ in FIG. 6 when the signal $V_+$ at the data terminal $D_+$ includes the voltage level shift and the data terminal $D_+$ has slight pollution at itself in accordance with the present invention. The voltage level shift is resulted from the impedance $Z_{HP}$ existed between the data terminal $D_+$ and the bus power terminal VBUS. The voltage level at the data terminal $D_+$ will be pulled to a voltage level slightly higher than the level of the ground because the data terminal $D_+$ has slight pollution at itself. That is, the equivalent impedance $Z_P$ at the data terminal $D_+$ formed by the impedance $Z_{HP}$ and $Z_{LP}$ will be reduced slightly. The slightly reduced impedance here means that there exist certain particles among the data terminal $D_+$ and the terminals VBUS and GND to cause slight pollution. However, this slight pollution is not capable of biasing the levels of the signals at the data terminals $D_+$ and $D_-$ or the data lines of the USB cable. As shown in FIG. 7B, the level of the signal $V_+$ is pulled to a level higher than the level of the ground but still not higher than the level of the signal $V_-$ during which the second enabling signal EN_I is enabled. A slight pollution is detected but the protection signal PRT is still disabled.

FIG. 7C shows the waveforms of the signals $V_+$ and $V_-$ in FIG. 6 when the signal $V_+$ at the data terminal $D_+$ includes the voltage level shift and the data terminal $D_+$ has heavy pollution at itself in accordance with the present invention. The voltage level shift is resulted from the impedance $Z_{HP}$ existed between the data terminal $D_+$ and the bus power terminal VBUS. The voltage level at the data terminal $D_+$ will be pulled up to a voltage level significantly higher than the level of the ground because the data terminal $D_+$ has heavy pollution at itself. That is, the equivalent impedance $Z_P$ at the data terminal $D_+$ formed by the impedance $Z_{HP}$ and $Z_{LP}$ is significantly low. Low impedance means that there exist certain particles among the data terminal $D_+$ and the terminals VBUS and GND to cause heavy pollution. This heavy pollution is capable of biasing the levels of the signals at the data terminals $D_+$ and $D_-$ or the data lines of the USB cable. As shown in FIG. 7C, the level of the signal $V_+$ is now higher than the level of the signal $V_-$ during which the second enabling signal EN_I is enabled. Thus, the protection signal PRT is enabled to control the switching controller 30 (as shown in FIG. 1) to shutdown the adaptive power converter.

Figure 8B:
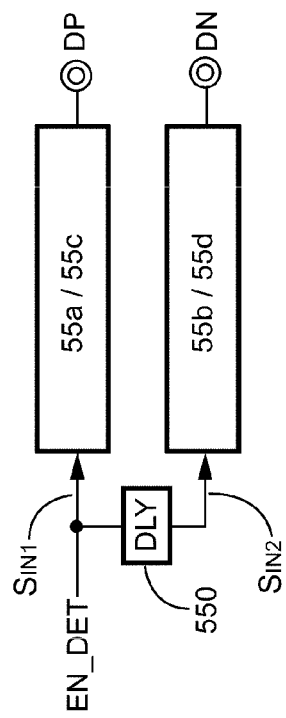
FIG. 8B shows a circuit diagram showing another exemplary arrangement of the impedance detection circuits in accordance with the present invention.
Figure 8A:
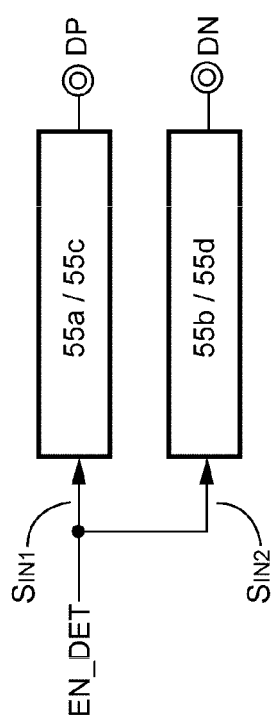
FIG. 8A shows a circuit diagram showing an exemplary arrangement of the impedance detection circuits in accordance with the present invention.
Figure 8D:
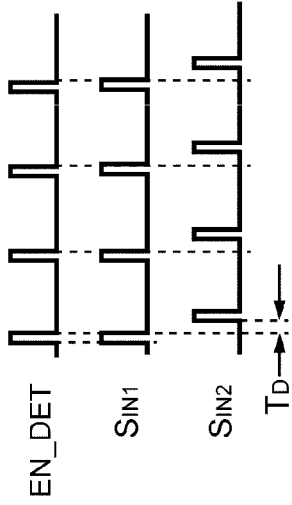
FIG. 8D shows a timing sequence diagram of the signals EN_DET, $S_{IN1}$, and $S_{IN2}$ in FIG. 8B in accordance with the present invention.
Figure 8C:
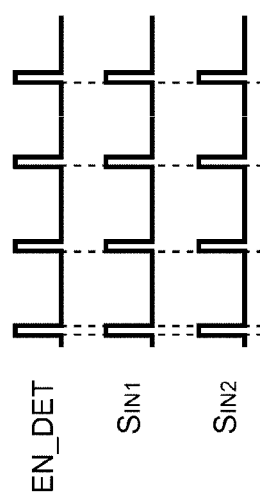
FIG. 8C shows a timing sequence diagram of the signals EN_DET, $S_{IN1}$, and $S_{IN2}$ in FIG. 8A in accordance with the present invention.

FIG. 8A shows a circuit diagram showing an exemplary arrangement of the impedance detection circuits 55a/55b/55c/55d in accordance with the present invention. As shown in FIG. 8A, the detection enabling signal EN_DET is utilized as a first trigger signal $S_{IN1}$ and a second trigger signal $S_{IN2}$ for triggering the first impedance detection circuits 55a/55c and the second impedance detection circuits 55b/55d, respectively. As shown in FIG. 8C, the first trigger signal $S_{IN1}$ and the second trigger signal $S_{IN2}$ are synchronous to perform pollution detection at the data terminals $D_+$ and $D_-$.

FIG. 8B shows a circuit diagram showing another exemplary arrangement of the impedance detection circuits 55a/55b/55c/55d in accordance with the present invention. As shown in FIG. 8B, the detection enabling signal EN_DET is utilized as the first trigger signal $S_{IN1}$. A delay circuit (DLY) 550 is coupled to receive the first trigger signal $S_{IN1}$ and delays the first trigger signal $S_{IN1}$ for generating the second trigger signal $S_{IN2}$. As shown in FIG. 8D, the first trigger signal $S_{IN1}$ is enabled firstly, and after the first trigger signal $S_{IN1}$ is disabled, there is a delay time $T_D$ before the second trigger signal $S_{IN2}$ is enabled. The delay time $T_D$ is determined by the delay circuit 550. As shown in FIG. 8D, the first trigger signal $S_{IN1}$ and the second trigger signal $S_{IN2}$ are asynchronous/interleaved to perform pollution detection at the data terminals $D_+$ and $D_-$.

It is understood that similar operations as above mentioned can be applied to detect the equivalent impedance $Z_N$ at the data terminal $D_-$ formed by the impedance $Z_{HN}$ and $Z_{LN}$ using the impedance detectors 55b and 55d. The operations thereof will be omitted herein.

It is also understood that the present invention can detect the pollution occurring at data terminals of the adaptive power converter when the USB cable is not connecting the adaptive power converter and the mobile device. When the USB cable connects the both, the pollution occurring at the data lines of the USB cable and the data terminals of the adaptive power converter and the mobile device can also be detected by the present invention.

Figure 9:
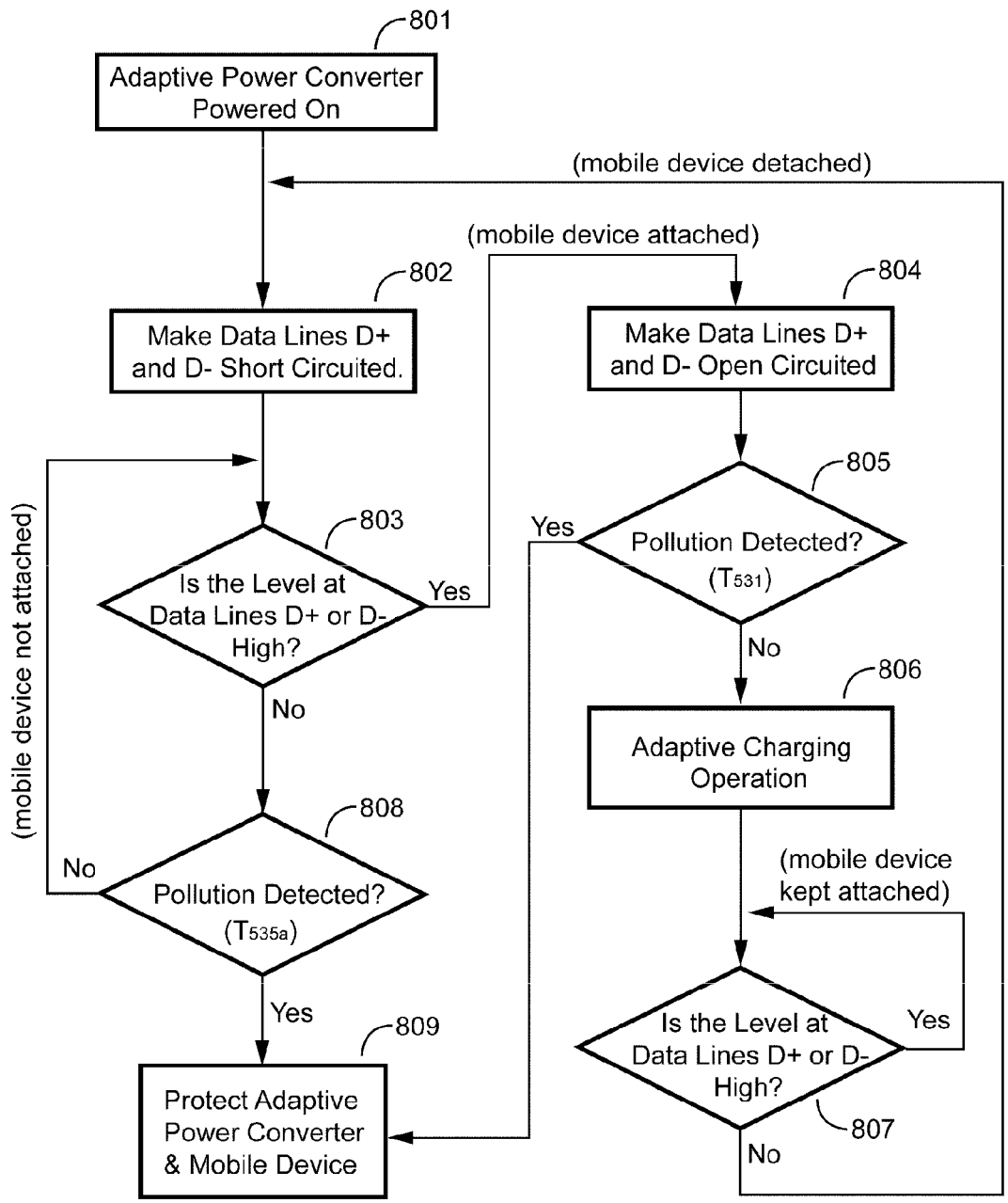
FIG. 9 shows a flow chart of an embodiment of a method for pollution detection at data lines in accordance with the present invention.

FIG. 9 shows a flow chart of an embodiment of a method for pollution detection at data lines in accordance with the present invention. The method is started as the adaptive power converter is powered on (step 801). The switch 58 (as shown in FIG. 1) is turned on to make the data lines $D_+$ and $D_-$ short circuited (step 802). Next, the adaptive power converter detects whether the level at the data lines (terminals) $D_+$ or $D_-$ is high or not (step 803). If the level at the data lines $D_+$ or $D_-$ is low, the detection enabling signal EN_DET (as shown in FIG. 3) will be periodically enabled within the time $T_{535a}$ shown in FIG. 3 to detect the impedance at data lines $D_+$ and $D_-$ for pollution detection (step 808). If the pollution doesn't occur at data lines $D_+$ and $D_-$, the adaptive power converter will periodically monitor if the level at the data lines $D_+$ or $D_-$ becomes high or not. In this stage, the mobile device is not attached to the adaptive power converter. Once the pollution occurs at data lines $D_+$ or $D_-$, the protection signal PRT (as shown in FIG. 1) will be enabled to control the switching controller 30 (as shown in FIG. 1) to shutdown the adaptive power converter for protecting the adaptive power converter and the mobile device (step 809). Whenever the level at the data lines $D_+$ or $D_-$ becomes high, the flow will go from step 803 to step 804. In this stage, the mobile device is now attached to the adaptive power converter. As step 804 shows, the data lines $D_+$ and $D_-$ will be open circuited by turning off the switch 58 (as shown in FIG. 1). Next, the detection enabling signal EN_DET (as shown in FIG. 3) will be enabled again for one time (within the time $T_{531}$) for pollution detection (step 805). Once the pollution is detected at the data lines $D_+$ or $D_-$, the protection signal PRT will be enabled to shutdown the adaptive power converter for protecting the adaptive power converter and the mobile device (step 809). On the contrary, if the pollution is not detected at the data lines $D_+$ or $D_-$, the adaptive power converter will perform adaptive charging operation for mobile device (step 806). Next, the adaptive power converter detects whether the level at the data lines $D_+$ or $D_-$ is high or not (step 807). If the level at the data lines $D_+$ or $D_-$ is low, which means the mobile device is detached from the adaptive power converter. The switch 58 (as shown in FIG. 1) will be turned on to make the data lines $D_+$ and $D_-$ short circuited again (step 802).

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A pollution detection circuit for data lines, comprising:
an impedance detector configured for coupling to at least one data terminal and detecting an impedance of said data terminal for detecting the pollution at said data terminal or said data lines; a sample and hold circuit, of the impedance detector, to store a value of a signal on the at east one data terminal as a stored signal; the impedance detector configured to apply a detection current to the at least one data terminal to form a detection signal wherein the pollution is confirmed in response to a difference less than a threshold value between the stored signal and the detection signal.

2. The pollution detection circuit as claimed in claim 1, further comprising:
a detection timing decision circuit, generating a detection enabling signal in response to a level at said data terminal for activating said impedance detector.

3. The pollution detection circuit as claimed in claim 2, wherein said detection timing decision circuit periodically enables said detection enabling signal for periodically activating said impedance detector to detect the pollution during which a mobile device is detached from a power converter.

4. The pollution detection circuit as claimed in claim 2, wherein said detection timing decision circuit enables said detection enabling signal for one time for activating said impedance detector to detect the pollution for one time when a mobile device is attached to a power converter.

5. The pollution detection circuit as claimed in claim 1, further comprising:
a switch, coupled between two data terminals; and a timing sequencer, coupled to said at least one data terminal and detecting a level at said at least one data terminal for confirming attachment of a mobile device to a power converter, turning on said switch to make said data two terminals short circuited when said mobile device is detached from said power converter, and turning off said switch to make said data two terminals open circuited when said mobile device is attached to said power converter.

6. The pollution detection circuit as claimed in claim 1, wherein said impedance detector comprises:
the sample-hold circuit, sampling and holding a signal at said at least one data terminal for generating a sample signal;
a current generation circuit, providing a detection current, in which a level of said signal at said at least one data terminal is changed in response to said detection current; and
a time sequencer, controlling said sample-hold circuit and said current generation circuit wherein said time sequencer activates said sample-hold circuit to sample and hold said signal at said at least one data terminal as a sampled signal while said current generation circuit is deactivated to not to provide said detection current, then said time sequencer deactivates said sample-hold circuit and activates said current generation circuit to provide said detection current to form a detection signal at said at least one data terminal, and the pollution is confirmed in response to a difference between the level of said sampled signal and a level of said detection.

7. The pollution detection circuit as claimed in claim 6, wherein said current generation circuit comprises a current source providing said detection current, and said impedance detector further comprises:
an operation unit, adding a reference signal and said sampled signal to generate a compared signal; and
a comparator, comparing the level of said detection signal and a level of said compared signal while said detection current is provided wherein the pollution is confirmed and a protection signal is generated when the level of said detection signal is lower than the level of said compared signal.

8. The pollution detection circuit as claimed in claim 6, wherein said current generation circuit comprises a current sink providing said detection current, and said impedance detector further comprises:
an operation unit, subtracting a level of a reference signal from the level of said sampled signal to generate a compared signal; and
a comparator, comparing the level of said detection signal and a level of said compared signal while said detection current is provided wherein the pollution is confirmed and a protection signal is generated when the level of said detection signal is higher than the level of said compared signal.

9. A pollution detection method for data lines, comprising:
configuring an impedance detector to sample a signal from a data terminal for detecting an impedance of the data terminal for detecting the pollution at said data terminal or said data lines, the impedance detector configured to store a value of a signal from said data terminal as a stored signal, apply a detection current to said data terminal to form a detection signal, wherein the pollution is confirmed in response to a difference less than a threshold value between the stored signal and the detection signal.

10. The pollution detection method as claimed in claim 9, further comprising periodically detecting the pollution while a mobile device is detached from a power converter.

11. The pollution detection method as claimed in claim 9, further comprising detecting the pollution for one time while a mobile device is attached to a power converter.

12. The pollution detection method as claimed in claim 9, further comprising:
making two data terminals short circuited while a mobile device is detached from a power converter; and making said two data terminals open circuited while said mobile device is attached to said power converter.

13. The pollution detection method as claimed in claim 9, further comprising:
providing the detection current; wherein the level of the signal at said data terminal is changed in response to said detection current to form the detection signal.

14. The pollution detection method as claimed in claim 13, further comprising: periodically providing said detection current for periodically detecting the pollution during which a mobile device is detached from a power converter.

15. The pollution detection method as claimed in claim 13, further comprising:
sampling and holding said signal at said data terminal for generating the sampled signal; wherein the pollution is confirmed in response to a level of said detection signal while said detection current is provided and a level of said sampled signal.

16. The pollution detection method as claimed in claim 15, further comprising:
adding a reference signal and said sampled signal to generate a compared signal; and comparing the level of said detection signal at said data terminal and a level of said compared signal when said detection current is provided; wherein the pollution is confirmed and a protection signal is generated when the level of said detection signal is lower than the level of said compared signal.

17. The pollution detection method as claimed in claim 15, wherein said detection current sinks a current from said data terminal for detecting the pollution, the method further comprises:
subtracting a level of a reference signal from the level of said sampled signal to generate a compared signal; and
comparing the level of said detection signal at said data terminal and a level of said compared signal when said detection current is provided wherein the pollution is confirmed and a protection signal is generated when the level of said detection signal is higher than the level of said compared signal.

18. A circuit for detecting pollution of data lines of a cable, comprising: a control circuit having a first terminal and a second terminal for connecting to first and second data hues; a switch coupled to short the first terminal to the second terminal; an impedance detector coupled to receive a signal from at least one data terminal of the first and second data terminals, the impedance detector configured to store a value of the signal as a stored signal during a first time interval, the impedance detector configured to apply a detection current to the at least one data terminal during a second time interval to form a detection signal wherein the pollution is confirmed in response to a difference less than a threshold value between the stored signal and the detection signal.

19. The circuit of claim 18 wherein the control circuit asserts a protection signal in response to confirming the pollution during the protection signal is configured for disabling a power supply to prevent supplying power to the power lines of the cable.

20. The circuit of claim 18 wherein the impedance detector is configured to close a first switch to couple the at least one data terminal to a sample and hold circuit during the first time interval and to open the switch to decouple the at least one data terminal from the sample and hold circuit during the second time interval.

* * * * *

UNITED STATES PATENT AND TRADEMARK OFFICE
CERTIFICATE OF CORRECTION

PATENT NO. : 10,116,351 B2
APPLICATION NO. : 15/000487
DATED : October 30, 2018
INVENTOR(S) : Eui-Soo Kim et al.

It is certified that error appears in the above-identified patent and that said Letters Patent is hereby corrected as shown below:

Column 14, Line 4, delete "east" and replace with -- least --;
Column 14, Line 58, following the last word "detection", add -- signal --; and
Column 16, Line 30, delete "hues" and replace with -- lines --.

Signed and Sealed this
Fourth Day of December, 2018

Andrei Iancu
*Director of the United States Patent and Trademark Office*